Patented May 31, 1938

2,118,932

UNITED STATES PATENT OFFICE 2,118,932

LIQUID FOR TREATING LEATHER, PARTICULARLY SHOES

Vincent Paul LoBianco, New York, N. Y.

No Drawing. Application December 24, 1936, Serial No. 117,520

4 Claims. (Cl. 134—7)

This invention relates to a compound for treating leather, and more particularly to a liquid for cleaning, softening and polishing leather shoes.

The primary object of my invention is to provide an improved composition for cleaning, softening and polishing leather products, especially leather shoes. A more particular object resides in the provision of such a composition which is in the form of a clear liquid and which is relatively simple and inexpensive, and which is readily applied to shoes for producing a high polish. Still another object is to provide a polishing liquid which may be used without a colored wash or paste, thereby avoiding stains and dirt during use, so that the composition is suitable for home use as well as for use at shoe-shine stands. Moreover, even when the condition of the shoes being shined is relatively bad, thus making it desirable to use a black or tan wash at the beginning of the treatment, it is unnecessary to use a paste, and the polishing liquid of my invention removes any excess coloring material from the washed shoes, thus effectually preventing staining of the clothing of the wearer after the shoes have been shined.

To the accomplishment of the foregoing and such other objects as may hereinafter appear, my invention consists in the composition elements and their relation to one another, as hereinafter are more particularly described in the specification and sought to be defined in the claims.

The cleaning composition is made up of lemon juice, oil of wintergreen and a hydro-carbon solvent, specifically benzine. Water may also be added in the course of manufacture, though it is later removed. A preferred formula for this composition is to mix one pint of lemon juice with one pint of water, the said mixture being boiled and then added to one half pint of oil of wintergreen, together with enough benzine to make up a gallon of the polishing fluid. This gallon of liquid is agitated at intervals for a suitable time, say twelve hours, and permitted to settle. The top liquid is poured off and used, there being about three quarts. The bottom liquid, amounting to somewhat less than a quart, is discarded. It might be thought that the lemon juice is thus wasted but some is retained in the upper liquid. In fact, the presence of the essential oils, etc. of the lemon juice may be recognized by the smell alone.

In terms of proportional parts, the above formula corresponds to the use in the original mixture of two parts of lemon juice to two parts of water to one part of wintergreen oil, and eleven parts of benzine.

However, the proportions of the ingredients may be varied over a wide range. For example, the amount of lemon juice and wintergreen oil may be very substantially increased to form a composition having say one part of lemon juice and one part of wintergreen oil to two parts of benzine by volume. I find that equal parts of each of the three ingredients results in a composition which is too thick for satisfactory use, but that on then doubling the amount of benzine, the composition becomes usable, although I prefer to use a far greater quantity of benzine, as defined in the preceding paragraph.

The amount of lemon juice and wintergreen oil may be decreased as well as increased, and I have made a useful composition in which these ingredients were only half the amount specified in the preferred formula. Specifically, a composition consisting of 8 ounces of lemon juice with or without some additional water, 4 ounces of oil of wintergreen, and the balance benzine to make up a gallon of the composition, is a useful composition, but the composition should not be diluted any further than this, because the amounts of lemon juice and wintergreen oil then become inadequate for satisfactory results. It is not essential to boil the lemon juice, and it is not essential to add water, but if the lemon juice is boiled, as I prefer and recommend, it then is convenient to add the water for the boiling operation.

The polishing liquid is intended primarily for use on ordinary black and tan shoes. It may be used on shoes of other colors, but should not be used on white shoes nor on suede shoes. The manner in which the liquid is used is as follows:—
In the case of new shoes or shoes in good condition, it is simply necessary to apply the liquid to the leather, as by means of a small rag or small roll of polishing cloth which is dampened or saturated with the liquid. The shoes are then polished with a polishing brush and are finished with a regular shoe polishing cloth. A second application of the polishing fluid may be employed if desired, but is not necessary unless a very high lustre is sought.

If the shoes are in neglected condition or abraded or discolored, it is desirable to first go over the shoes with an ordinary black or tan wash. A little of the wash is placed on a small brush in conventional manner and is rubbed over the leather surface. This wash is particularly good for application around the periphery of the sole and in the crevice between the sole and the upper. The shoes are then dried with a rag to remove excess wash. My polishing liquid is then applied by means of a damp or saturated rag as above described, after which the shoes are polished with a brush and finally with a polishing cloth. This gives the shoes a beautiful finish, and as above mentioned, a second application of the polishing liquid may be used if desired.

One important advantage of my polishing liquid is that it is colorless and does not stain clothing coming into contact with the shoes. This advantage manifests itself even more strongly when shoes are preliminarily treated with a colored wash as above described, for my polishing liquid removes any excess coloring matter and protectively coats the retained or absorbed coloring material so that the shoes thus treated will not stain the clothing of the wearer despite the preliminary use of a wash. This is to be contrasted with the use of colored paste which actually increases the danger of staining.

I have empirically discovered the improved polishing liquid here described, and do not pretend to be able to fully explain the beneficial results obtained with the same. I know from personal experimentation that comparable results cannot be obtained by the use of either the lemon juice, oil of wintergreen or the benzine alone, or in succession in varying order and proportion. The composition with the resulting simultaneous application of all three ingredients to the leather produces surprisingly beneficial results not only by way of polishing, but also in cleaning and softening the leather of the shoes, the results being far superior to anything which might be expected from a study of what happens when each of the ingredients is used alone.

It will be apparent that while I have shown and described my invention in its preferred form, changes and modifications may be made in the composition disclosed without departing from the spirit of the invention defined in the following claims.

I claim:

1. A clear transparent colorless liquid for cleaning, softening and polishing tan or black leather shoes or other leather products, said liquid comprising the supernatant liquid from a mixture of lemon juice, oil of wintergreen and benzine in a proportion by volume lying between 1, 1, and 2 parts respectively, at one extreme, and 2, 1 and 29 parts respectively at the other extreme.

2. A clear transparent colorless liquid for cleaning, softening and polishing black or tan leather shoes or like leather products, said liquid comprising the supernatant liquid from a mixture of lemon juice, water, wintergreen oil and benzine in the proportions of 2, 2, 1, and 11 parts by volume.

3. A clear transparent colorless liquid for cleaning, softening, and polishing black or tan leather shoes or like leather products, said liquid comprising the supernatant liquid from a mixture of lemon juice, wintergreen oil, benzine, and water, in the proportion of 16 ounces of lemon juice, 8 ounces of wintergreen oil, and enough benzine and water to make up a gallon of liquid, the amount of benzine being very much greater than the amount of water.

4. A clear transparent colorless liquid for cleaning, softening and polishing black or tan leather shoes or like leather products, said liquid comprising the supernatant liquid from a mixture of lemon juice, water, wintergreen oil and benzine in the proportion of 16 ounces of lemon juice, 16 ounces of water, 8 ounces of wintergreen oil and enough benzine to make up a gallon of liquid.

VINCENT PAUL LoBIANCO.